No. 802,147. PATENTED OCT. 17, 1905.
H. G. KUCK.
UTENSIL HANDLE.
APPLICATION FILED JAN. 20, 1905.
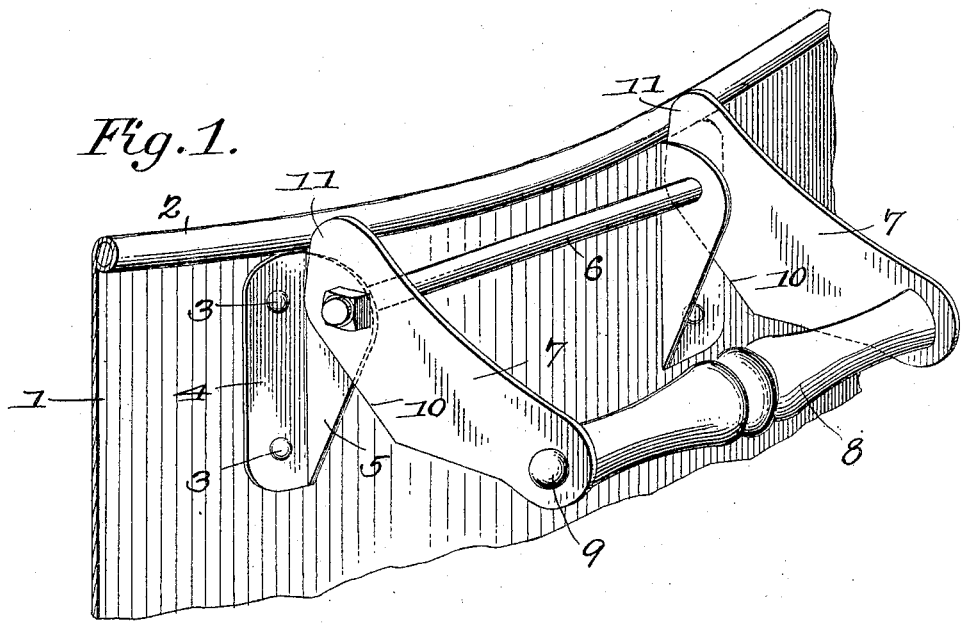
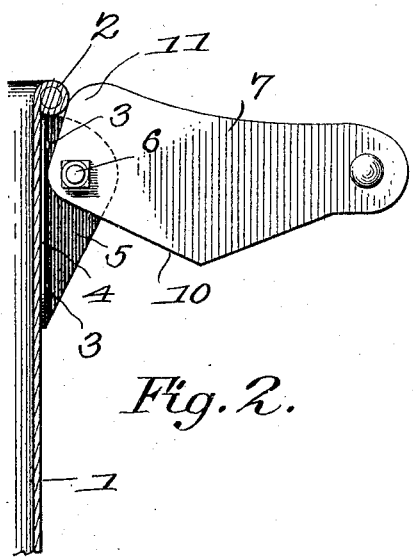
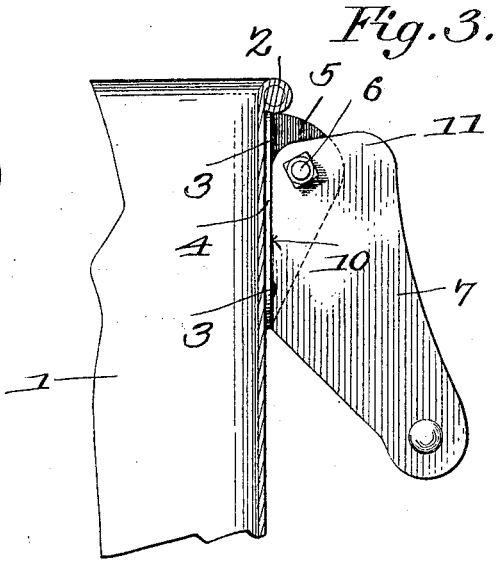
Witnesses:
Henry G. Kuck, Inventor
by C. A. Snow & Co.
Attorneys.

UNITED STATES PATENT OFFICE.

HENRY G. KUCK, OF PEORIA, ILLINOIS, ASSIGNOR OF ONE-HALF TO JOSEPH STUBER, OF PEORIA, ILLINOIS.

UTENSIL-HANDLE.

No. 802,147.  Specification of Letters Patent.  Patented Oct. 17, 1905.

Application filed January 20, 1905. Serial No. 242,015.

*To all whom it may concern:*

Be it known that I, HENRY G. KUCK, a citizen of the United States, residing at Peoria, in the county of Peoria and State of Illinois, have invented a new and useful Utensil-Handle, of which the following is a specification.

This invention relates generally to utensil-handles, and particularly to one adapted for use in connection with a washboiler or other receptacle to contain boiling liquid.

The object of the invention is to provide a handle which shall combine simplicity of construction with great strength and durability and readiness of adaptation to position and which shall be so constructed as to prevent burning of the hands of a person handling the utensil to which the handle is secured.

With the above and other objects in view, as will appear as the nature of the invention is better understood, the same consists in the novel construction and combination of parts of a utensil-handle, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in perspective of a portion of the utensil, in this instance a washboiler, exhibiting the handle of the present invention applied thereto. Fig. 2 is a view in side elevation showing the handle at the limit of its raised position. Fig. 3 is a similar view showing the handle at the limit of its dropped position.

Referring to the drawings, 1 designates a portion of a washboiler, the upper edge of which is provided with a reinforced bead 2. Secured to the boiler, as by rivets 3, are two ears, each comprising a base 4, through which the rivets are passed, and a flange 5, extending at right angles to the base member. The flanges are perforated to receive a bolt 6, which is provided for the purpose of assembling the handle portion proper with the ears in such manner as to prevent both the flanges of the ears and the handle from spreading or yielding from lateral strain. The handle comprises two arms 7 and a handhold 8, preferably of non-conducting material, which is combined with the arms by a bolt or rivet 9.

As above stated, one of the objects of the invention is to remove any liability of an attendant burning his hands in handling the boiler when containing boiling water either in initially lifting the handles or moving the boiler. The first-named object is secured by providing the under sides of the arms with angular portions 10, which are designed to bear against the bases of the ears, as clearly shown in Fig. 3, and thus throw the handhold away from the boiler a sufficient distance to enable the operator to insert his hand between it and the boiler without touching the latter. The second object stated is secured by providing each arm with a shoulder 11, which is adapted to bear against the bead of the boiler, as clearly shown in Fig. 2, thereby positively limiting the upward movement of the handle and causing it when raised to occupy a position substantially at right angles to the side of the boiler.

The handle and ears will be made of any suitable material, preferably of sheet metal, and can be readily and cheaply stamped to the appropriate shape and be easily applied to the boiler.

By having the ears and arms connected by the bolt 6 there can be no lateral yielding of one of the parts independent of the other, so that great strength and durability are secured by the arrangement shown.

Having thus described the invention, what is claimed is—

The combination with a utensil provided with a reinforced beaded upper edge, of a handle comprising a pair of ears, arms having their lower edges formed with angular extensions to engage the ears and their upper edges formed with shoulders to engage the beaded edge, a single bolt connecting the arms and ears, and a handhold combined with the arms.

In testimony that I claim the foregoing as my own I have hereto affixed my signature in the presence of two witnesses.

HENRY G. KUCK.

Witnesses:
  THEO. ABELE,
  EMIL W. OST.